US007442338B2

(12) United States Patent
Lopetegui et al.

(10) Patent No.: US 7,442,338 B2
(45) Date of Patent: Oct. 28, 2008

(54) PRODUCT MANUFACTURE IN STRUCTURAL METALLIC MATERIALS REINFORCED WITH CARBIDES

(75) Inventors: Ignacio Erauskin Lopetegui, San Sebastian-Guipuzcoa (ES); Manuel Gutierrez Stampa, San Sebastian-Guipuzcoa (ES); Iñigo Agote Beloki, San Sebastian-Guipuzcoa (ES); Manuel Orbegozo Ibarguren, San Sebastian-Guipuzcoa (ES)

(73) Assignee: Fundacion Inasmet, San Sebastian (ES)

( * ) Notice: Subject to any disclaimer, the term of this patent is extended or adjusted under 35 U.S.C. 154(b) by 0 days.

(21) Appl. No.: 10/847,971

(22) Filed: May 13, 2004

(65) Prior Publication Data

US 2004/0241032 A1 Dec. 2, 2004

Related U.S. Application Data

(63) Continuation of application No. PCT/ES01/00430, filed on Nov. 13, 2001.

(51) Int. Cl.
 *C22C 1/10* (2006.01)
(52) U.S. Cl. .............................. 419/63; 419/62; 419/15; 75/236; 75/240; 75/560; 420/12; 420/123; 148/328; 148/408; 148/409; 148/538
(58) Field of Classification Search .................... 75/312, 75/241; 419/15
 See application file for complete search history.

(56) References Cited

U.S. PATENT DOCUMENTS 3,829,312 A * 8/1974 Araki et al. .................... 420/87

| 3,840,367 | A | * | 10/1974 | Rudy | .......................... | 51/293 |
| 5,023,145 | A | * | 6/1991 | Lomax et al. | ............... | 428/614 |
| 5,173,107 | A | * | 12/1992 | Dreyer et al. | .................. | 75/229 |
| 5,411,571 | A | * | 5/1995 | Kobayashi et al. | ............ | 75/232 |
| 6,685,763 | B1 | * | 2/2004 | Bertrand et al. | ............... | 75/568 |
| 2004/0028548 | A1 | * | 2/2004 | Andersson et al. | ............ | 420/12 |
| 2005/0106411 | A1 | * | 5/2005 | Ishikawa et al. | ............ | 428/683 |
| 2006/0201592 | A1 | * | 9/2006 | Ishikawa et al. | ............ | 148/593 |

FOREIGN PATENT DOCUMENTS

| EP | 0 348 380 | | 12/1989 |
| ES | 2 052 971 | | 7/1994 |
| WO | WO 93/03192 | | 2/1993 |
| WO | WO 94/11541 | | 5/1994 |
| WO | WO9411541 | * | 5/1994 |
| WO | WO 9411541 A1 | * | 5/1994 |

OTHER PUBLICATIONS

A. Varma and A. S. Mukasyan, Combustion Synthesis of Advanced Materials, ASM Handbook, vol. 7, pp. 523-540, 1998.*

* cited by examiner

*Primary Examiner*—Roy King
*Assistant Examiner*—Christopher Kessler
(74) *Attorney, Agent, or Firm*—Katten Muchin Rosenman LLP

(57) ABSTRACT

The present invention develops a manufacture method, via conventional liquid metallurgy, of finished and semi-finished metallic parts as casting, ingot, blooms and slabs in alloys base Fe, base Ni and base Co, microstructurally reinforced with complex molybdenum and titanium carbide particles, by means of their previous elaboration and latter addition to the molten alloy in the melting furnace. Then, when the alloy solidifies, they are inserted and distributed within the grains of the base metallic matrix, enhancing their mechanical properties and behavior at room as well as at high temperatures.

11 Claims, 2 Drawing Sheets

Microstructure of the reinforced material: Grey carbides (MoTi)C agglomerated by Fe (white)

FIG. 1.- Microstructure of the reinforced material: Grey carbides (MoTi)C agglomerated by Fe (white)

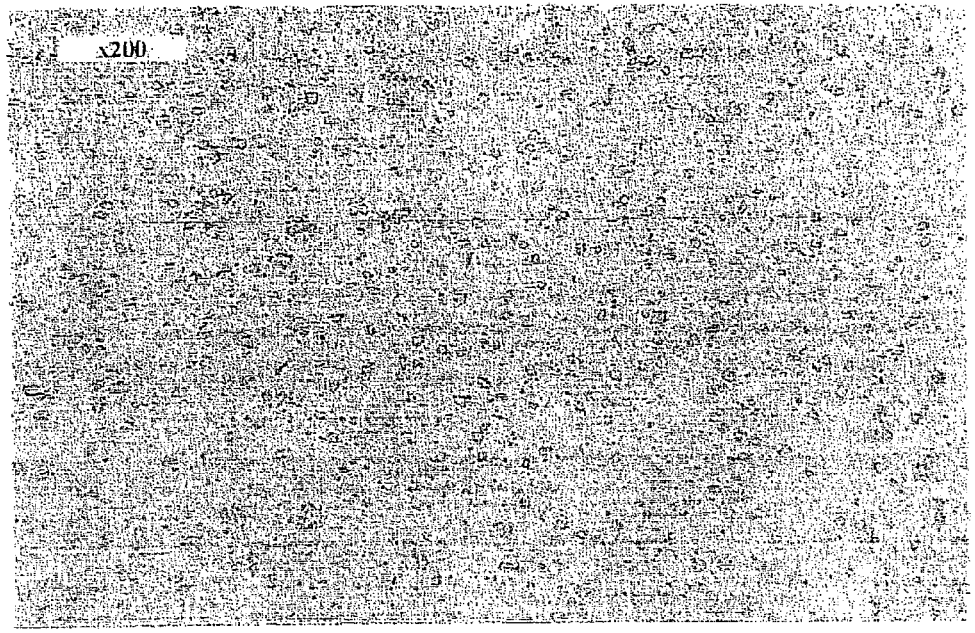
Fig. 2.- Microstructure of the reinforced material: Steel matrix with carbides (MoTi)C embedded therein

PRODUCT MANUFACTURE IN STRUCTURAL METALLIC MATERIALS REINFORCED WITH CARBIDES

CROSS-REFERENCE TO RELATED APPLICATION

The present application is a continuation of International Application No. PCT/ES01/00430 filed on Nov. 13, 2001.

BACKGROUND OF THE INVENTION

The composite components ceramic-metal, obtained by powder metallurgy and conformed by means of the introduction of ceramics in the metal matrices bases softer are meriting an ample acceptance by its properties of cutting and wear resistance. The ceramic powders that more usually are utilized for these applications are refractory metal carbides like those of titanium, tungsten, zirconium, etc.

On the other hand, the improvements that could be obtained, through the reinforcing with hard particles, in the properties of structural alloys and surface layers, as an increase of the mechanical resistance, to the wearing, thermal stability, etc., also are accepted and recognized.

Overall ceramic materials of reinforcement, one of most attractive is the titanium carbide, by its high hardness, thermal stability and low density, but the particle incorporation of this carbide as layering material, cermets and cast metallic products (finished or semi-finished) has great technical difficulties, due to their propensity to the oxidation, poor wettability and segregation tendency.

With the aim to resolve some of these difficulties, patent WO9303192 develops powdered products based in TiC and with additions of W, Fe, Ni, Co, etc., in order to reinforce cast iron alloys, welding material and surface layers.

Nevertheless, it has been verified that these products are inadequate for their incorporation, conventional metallurgy process, to molten alloys base Fe (steel or iron), base Ni or base Co, due, mainly, to the poor wettability of the TiC into these liquid baths.

In the other hand, patent WO9411541 develops a process for the Fe-base alloys reinforcement by means of the addition of carbides of the liquid metal. Some of the disadvantages and problems of industrial application of this patent are the following ones:

- To improve the carbide wettability, it is necessary to cover it with metallic elements as iron, nickel, copper, titanium and carbon. It is not indicated how one obtains carbide nor the form to cover it but, in any case, must be expensive.
- The particles have to have similar density to the one of the base material. For this reason, it is necessary the availability of complex carbides of titanium and tungsten. It is not indicated how to obtain them but, in any case, the process must be more complicated and expensive than the one from the present invention.
- It is not contemplated its application to materials base Ni and base Co.
- In the ferrous alloys field, its application does not include the steels with $\leq 0.3\%$ C.
- In the better case, the addition yield (carbides inserted in the matrix/added carbides) is not higher than 50%.

Therefore, the improvements obtained by this method is negatively affected by the mentioned aspects, as well as from the technical-operative point of view (problematic particle availability, half of added particles are coalesced together, being agglomerated in the lining of the melting furnace, delaying the heat, dirtying the metal, etc.), as economic aspect (the very high cost of particles must be multiplied by two in the end product). In addition, it does not include the steel family more indicated for its reinforcing, those of low carbon, that by their high toughness and low wear resistance, needs to increase this one without damage that one.

DESCRIPTION OF THE INVENTION

Brief Description of the Drawings

FIGS. 1-2 are photomicrographs showing a microstructure of structural metallic materials according to the present invention.

For that the reinforcement of the metallic materials by means of the liquid metallurgy process become technical and economically viable at industrial level it requires of the development and use of a new type of reinforcing material, technically adapted for its incorporation to the molten metal (with a similar yield to the one of the rest of the alloying materials) and with the lower fabrication cost possible, as well as of the optimization of the metallurgical process of addition of the reinforcing material, at solid state, to metallic alloys in liquid state. In addition, the properties improvement of the reinforced alloy are a direct function of the nature of the particles of reinforcement, their homogenous and uniform intragranular distribution, without coalescence among them, of the size and regular morphology of the same ones and their metallurgical coherence with the base alloy.

Then, the present invention is based, first of all, in the design and making method of the reinforcing material that fulfils the previous technical-economic requirements. In this sense, it has been verified that the complex carbides of X(MoTi)C type, where X can be Fe, Ni or Co, and with the chemical composition that will be defined below, they maintain the inherent advantages to titanium carbide and allow to overcome the technical and economical limitations above indicated in its applications as structural metallic alloy reinforcement.

Effectively, in order that any particle type could be used as metallic alloy reinforcement, by its incorporation, in solid state, to the metallic alloy in liquid state and the later metallurgical insertion once it has solidified, must be increased, to the higher level possible, the wettability of the particle into the mentioned alloy. For it, the contact angle between the solid particle and the liquid must be the smallest possible and this value almost totally depends on the chemical nature and compositions of both materials.

In this sense, during the development of the present invention it has been verified that, unlike particles of TiC and (WTi)C, the solid particles formed by carbides of (MoTi)C type are easily wet by molten alloys base Fe, base Ni and base Co.

In addition, due to the very negative formation energy of the titanium carbide (to any temperature) and of molybdenum carbine (above 1500° C.), the proposed procedure for it making is simple, economic and perfectly applicable to industrial level.

Effectively, this procedure is based on the extremely exothermic nature of both formation reactions:

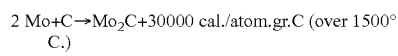

This means that the formation of the TiC from its constituent elements is very advantageous from the thermodynamic point of view, just like the one of the Mo$_2$C when is reached (or exceeded) the temperature of 1500° C. On the other hand, once the first reaction begins, the temperature rises quickly (due to the liberated heat), facilitating the second reaction, unlike the case in that the complex carbide is of the type (WTi)C, where the wolfram carbide has to add previously made. The mentioned facility of reaction is advantageous, in addition, in order that the reactive elements could be diluted by means of the addition of other metallic elements, as Fe, Ni or Co, that melt to the temperatures that are being reached during the reaction and act as binders of produced carbides. During the later process of its addition to the molten alloy, the binder melts on contact with this one and increases the wettability and metallurgical insertion of the reinforcing carbide.

On condition that this reinforcement material can be obtained to a low cost, as it happens with the process that will be below described, the design of the same one also includes the proportional quantification of each chemical element (in function of the TiC), having been contrasted that the optimal results are reached with the following percentage values.

TiC: 50-90%
Mo: ≧5%
X (Fe, or Ni, or Co): ≧5%
Ti/C ratio in carbide: Approximately equiatomic (one atom of Ti by one of C).

Besides the high yield of the addition of these carbides to the alloy to be reinforced and the degree of reinforcement that is from this one, the cost of the end product is lowered by the use of appropriate techniques for the previous manufacture of such carbides. These techniques are based on the self-propagating high temperature synthesis reactions of chemical compounds strongly exothermic, as it is the case of the present carbides. To achieve the technical goal of the invention, in case that the necessary amount of carbides is small, the previous manufacture of such carbides it can be made by means of a discontinuous process, in which, once prepared and mixed a certain amount of raw materials, they are introduced in a reactor where the reaction of synthesis to high temperature takes place, and when reaction product cools, it is extracted of the reactor, repeating, in this way, the production cycle until the attainment of the required amount. Nevertheless, during the development of the present invention it has been stated that the productivity of this process is sensibly increased and the production cost decreased using a process in continuous, developed previously by FUNDACION INASMET for the obtaining of other ceramic materials. This process, along with necessary productive equipment for its application, is gathered in patent EP1060789: "Continous procedure for manufactures of powdered materials by combustion and reactor for the realisation thereof".

Due to the high exothermic character of the (MoTi)C carbide reaction formation, as well as to the facility whereupon the required thermodynamic conditions after their beginning and accomplishment can be reached, the synthesis, from the raw materials that contain the adapted proportions of C, Ti, Mo and Fe or Ni or Co, can be made also in continuous, according to the process described in the mentioned patent, being increased by this way the productivity, which allows, on the one hand, the possibility of having great amounts of reinforcement material and, on the other hand, of reducing its production costs. In addition, the necessary reactive elements can be incorporated in bi or trimetallic alloy form available in the market to smaller cost than individual metals, like Fe—Ti, Fe—Mo, Ni—Ti, Co—Ni—Mo, etc.

In any of both ways the necessary reinforcing product for each alloy family is obtained: Fe(MoTi)C for the reinforcement of steels and cast irons; Ni(MoTi)C for alloys base nickel; and Co(MoTi)C for those of base cobalt. The titanium and molybdenum carbide particles, 1-4 microns size and rounded shape, are agglomerated by the metal Fe in the first case, by the metal Ni in the second case and by the metal Co in the third case.

The second aspect of the invention lies in the process of addition of these new reinforcement materials to structural metallic alloys base Fe, base Ni or base Co.

As it has been mentioned previously, the presence of Mo in the complex carbide, sensibly improves its wettability within of Fe, Ni and Co alloys, wettability that is increased when these carbides are agglomerated by the same metal that the basic constituent of the alloy, which they are tried to add into. In addition, due to its very elevated negative formation energy, they are very stable as much in low temperatures as in the temperatures in which the mentioned alloys are in molten state (of the order of 1.500° C.). Therefore, the manipulation and processing of this material are simple and do not need special measures to avoid their deterioration in contact with the environmental atmosphere, either by oxidation or other causes, nor their decomposition in the liquid bath. Nevertheless, the yield of their addition to this one and the distribution of small carbide particles in the matrix of the metallic alloy play an important role in the final result. Thus, whichever greater it is the yield of the addition (carbides present in the final product/carbides added to the molten alloy), lower is the cost, on equal characteristics, of this final product. Also, in such case, the cleaning, deslagging and adjustment of the liquid alloy in the melting furnace are less complicated and onerous. On the other hand, the improvement of mechanical characteristics of the reinforced alloy is direct function of the homogenous one and uniforms intragranular distribution of carbides, without coalescence among them, of the rectangular morphology of them and its metallurgical coherence with the base material.

In the case of the present invention, the optimization of such parameters has been obtained, on the one hand, by means of the appropriate design of carbides and their obtaining process, as it has been described previously, and, on the other and, by means of the following sequential procedure of addition in the melting furnace:

a) Adjust of the material to be added. The X(MoTi)C reinforcement material, in a not higher than 10% proportion in weight of the total charge of the bath, is mixed with commercial Si—Ca normally used as desgasifier element of mentioned alloys, in proportion of around 10% of the reinforcement material.

b) Melt of the metallic alloy, base Fe (steel or cast iron), base Ni or base Co, according to the conventional process and in furnaces, usually used for the melting of these materials.

c) Addition of the reinforcing material mixed with Si—Ca. This begins when the base charge is in molten state and at a temperature of 150° C. higher than the "sólidus" temperature of the alloy. The operative way of the addition is similar to the one of any other material provided in the conventional metallurgical process (ferroalloys, more or less pure metals, etc.), for the adjustment of the chemical composition of alloys. One of the novel aspects and optimizers of the invention, is indeed in the positive and determining effect of Si—Ca, since, as it has been verified, if the X(MoTi)C is only added (in relatively fine and powder way), tends to coarse together and to deposit in the walls of the furnace, whereas when the Si—Ca is incorporated to the molten bath, takes place a reaction of exothermic oxidation of the Ca with the oxygen of the same one, giving rise to a reduction of the liquid bath-carbide particles surface tension and favoring the insertion and dispersion of these in its sine.

d) Once the addition has been completed, the resulting liquid material, metallic alloy+reinforcing carbides, is processed in the conventional way, being able to be poured in molds (sand, ceramic, metallic, etc.) to obtain castings, or in ingot-molds, to obtain semi-processed products.

The yield of the addition is over 80%, reason why the losses can be considered as normal as in any other metallurgical operation of adjustment of chemical composition of an alloy.

As a result, castings or semi-processed products are obtained, with a microstructure composed by the corresponding metallic matrix (base Fe, base Ni or base Co) plus titanium and molybdenum carbide particles inserted within it, of high hardness and thermal stability, 2-5 microns of size and regular shape, coherently bonded, dispersed and homogenously distributed inside the grains of the matrix. This product can later be put under any type of heat treatment, thermochemical or thermo-mechanical, without the carbide particles undergo any deterioration.

FIG. 1 demonstrates the microstructure of (MoTi)C carbides made using the process above, and FIG. 2 demonstrates the microstructure of the reinforced material.

Consequently, the product thus obtained has got the own characteristics of the metallic matrix base, according to the alloy and of its later processing, improved and increased by the reinforcing and hardening effect of inserted carbides. These enhanced effects are related, mainly, to the fatigue and wear resistance at room temperature, and to the creep and abrasion resistance at high temperatures. Taking as reference the values of the characteristics corresponding to the metallic alloy without reinforcement, the increase obtained on these values, with new products, is higher than 50%.

The invention claimed is:

1. Product manufacture method, via liquid metallurgy, of structural metallic materials base Fe, base Ni, and base Co, reinforced with X(MoTi)C previously made carbides, wherein the proportions of said carbides are TiC: 50-90%; Mo$\geq$5%; X$\geq$50% and wherein the X(MoTi)C carbides are made from elemental powder materials containing their constituent elements X, Ti, Mo, and C, by self-propagating high temperature synthesis due to the heat released in the exothermic carbide formation reactions and without external energy contribution except for initiating the synthesis reaction, whereby once a first reaction between Ti and C begins, temperature rises quickly due to liberated heat facilitating a second reaction with Mo.

2. Manufacture method, according to claim 1, in which the X(MoTi)C previously made carbides are added, in solid state, to the base metallic material when this one is in molten state in the melting furnace.

3. Manufacture method, according to claims 1 or 2, wherein, after the solidification of the poured material from the melting furnace, the resulting product has got the metallic matrix of the base material and, inserted on it, hard, stable, 2-5 microns size, polygonal, dispersed and homogenously X(MoTi)C distributed carbides.

4. Manufacture method according to claims 1 or 2, in which X is Fe for the reinforcing of steel and cast irons.

5. Manufacture method according to claims 1 or 2, in which X is Ni for the reinforcing of alloys base nickel.

6. Manufacture method according to claims 1 or 2, in which X is Co for the reinforcing of alloys base cobalt.

7. Method of previous making of X(MoTi)C carbides, by which the process of claim 1 is discontinuous.

8. Method of previous making of X(MoTi)C carbides, by which the process of claim 1 is in continuous, much more productive and less difficult.

9. Manufacture method according to claims 1 or 2, in which the X(MoTi)C carbides are mixed with grains of Si—Ca, before its addition to the base X molten alloy in the melting furnace.

10. Manufacture method of casting parts in metallic materials base x, in which the liquid alloy that contains the designed, made and added carbides according to claim 1, is poured in sand molds (sand castings), ceramic molds (investment castings) or centrifuged molds (centrifugal casting) for its solidification, and later processing of the castings reinforced with hard, stable, 2-5 micron size, polygonal, dispersed and homogenously X(MoTi)C distributed carbides.

11. Manufacture method of semi-processed base X metallic products reinforced with hard, stable, 2-5 micron size, polygonal, dispersed and homogenously X(MoTi)C distributed carbides, in which the liquid alloy that contains the designed, made and added carbides, according to claim 1, is poured in ingot-molds, to obtain ingots, or poured in continuous, to contain blooms or slabs.

* * * * *